March 4, 1924.

Re. 15,780

J. DITSON

HOIST

Original Filed July 20. 1921 2 Sheets-Sheet 1

INVENTOR
Jesse Ditson
BY
Herbert L. Ogden
HIS ATTORNEY

March 4, 1924. Re. 15,780

J. DITSON

HOIST

Original Filed July 20, 1921 2 Sheets-Sheet 2

INVENTOR
Jesse Ditson.
BY Herbert G. Ogden
HIS ATTORNEY

Reissued Mar. 4, 1924. Re. 15,780

UNITED STATES PATENT OFFICE.

JESSE DITSON, OF LITTLETON, COLORADO, ASSIGNOR TO INGERSOLL-RAND COMPANY, OF JERSEY CITY, NEW JERSEY, A CORPORATION OF NEW JERSEY.

HOIST.

Original No. 1,421,183, dated June 27, 1922, Serial No. 486,097, filed July 20, 1921. Application for reissue filed November 22, 1923. Serial No. 676,465.

*To all whom it may concern:*

Be it known that I, JESSE DITSON, a citizen of the United States, and a resident of Littleton, county of Arapahoe, State of Colorado, have invented a certain Hoist, of which the following is a specification, accompanied by drawings.

This invention relates to hoists, but more especially to a power driven hoist of the double drum type, in which either drum may be driven from a common driving shaft.

Such hoists are particularly useful for haulage purposes or in connection with other work in which the load is carried by a continuous rope or cable adapted to be wound up on the haulage or lifting drum as it is unwound from the tail rope drum.

The objects of the invention are to enable two drums, as for instance a haulage drum and a tail rope drum, to be driven from a common source by improved means and devices which automatically disconnect one drum and connect the other drum to the driving shaft, in accordance with the direction of rotation of the shaft.

Further objects of the invention are to produce a simple, compact, rugged and highly efficient self-contained hoist combining a source of power and driving and driven elements within and upon one mounting, so constructed that all the operative parts are readily accessible and easily assembled and disassembled.

Further objects will hereinafter appear, and to all of these ends the invention consists of the hoist described and claimed in this specification and shown in one of its preferred forms in the accompanying drawings, in which—

Figure 1:
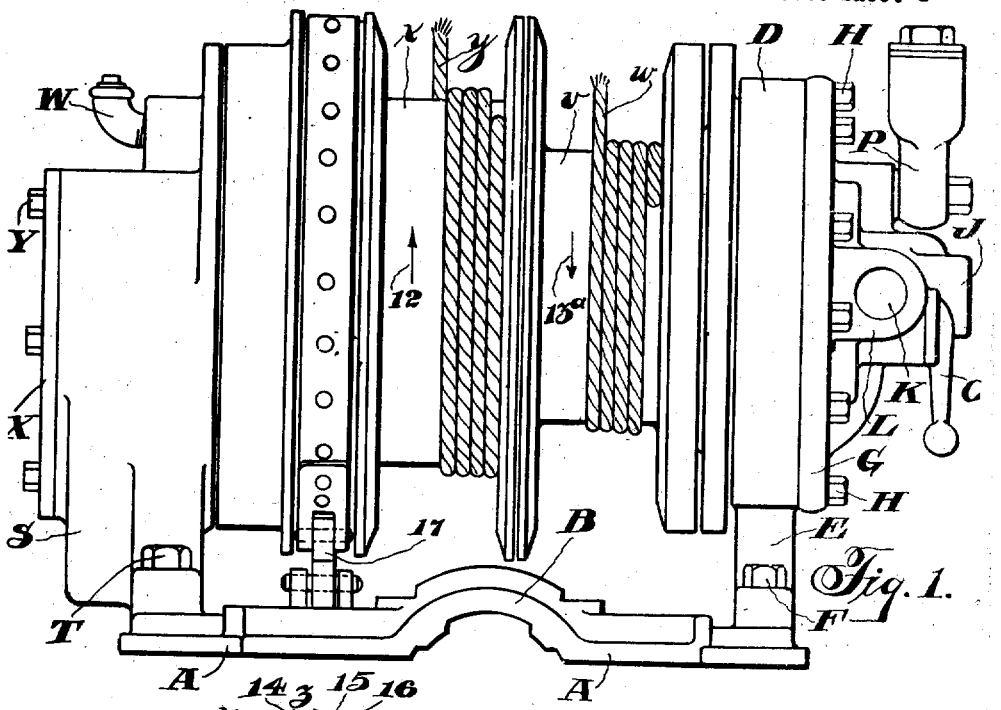
Figure 1 is a side elevation of the hoist.

Referring to the drawings, the base plate A on which the hoist is mounted, is provided with a clamping member preferably in the form of a saddle clamp B having the clamping bolts C for securing the hoist to a column, cross bar or other support. Any suitable motor may be provided for the hoist, and in this instance a fluid pressure motor is indicated, comprising the cylinder D mounted on the frame E bolted to the base plate as by means of the bolts F. A cylinder head G is secured to the cylinder by the cap bolts H and fluid pressure, as for instance compressed air, is supplied to the motor through the inlet J controlled by a suitable valve K in the valve chest L and manipulated by the valve lever O. In this instance, the motor is assumed to be a reversible motor, the reversal of which is controlled by the valve lever O. An oiling device P of any suitable type may be applied to the motor.

A center bearing Q shown in this instance in the form of a shell, having a tubular body and a flanged portion R, is connected to the motor cylinder D and the cylinder head G by means of the cap bolts H. The opposite end of the center bearing is supported in the gear box S, which is secured to the frame A by the bolts T. A center bearing retaining screw U suitably secures the center bearing to the inner wall V of the gear box S. An oiling connection W may be provided upon the gear box. The gear box cover X is secured to the gear box by means of the bolts Y. The construction of the motor and frame so far described forms a simple and compact frame for the hoist, easily assembled and disassembled and permitting ready accessibility to the operative parts of the hoist.

A main driving shaft *a* passing centrally through the center bearing Q is supported in the ball bearings *b* and *c* and provided with the crank disc *d* having the crank pin *e* connected to the piston *f* of the motor by means of the ball bearing *g*, so that the driving shaft *a* operates throughout in ball bearings.

A driving pinion *h* is keyed to the driving shaft *a* and a retaining washer *j* is held against the driving pinion by means of the pin *k*. The driving pinion *h* meshes with an intermediate gear *o* keyed to the counter-shaft *p* operating in the ball bearings *q* and *r* mounted in the gear box S. An intermediate pinion *s* on the counter shaft *p* meshes with the internal gear *t* of the main driver *u* adapted to rotate on the center bearing Q, from which power is taken for driving either one of the two drums.

Figure 2:
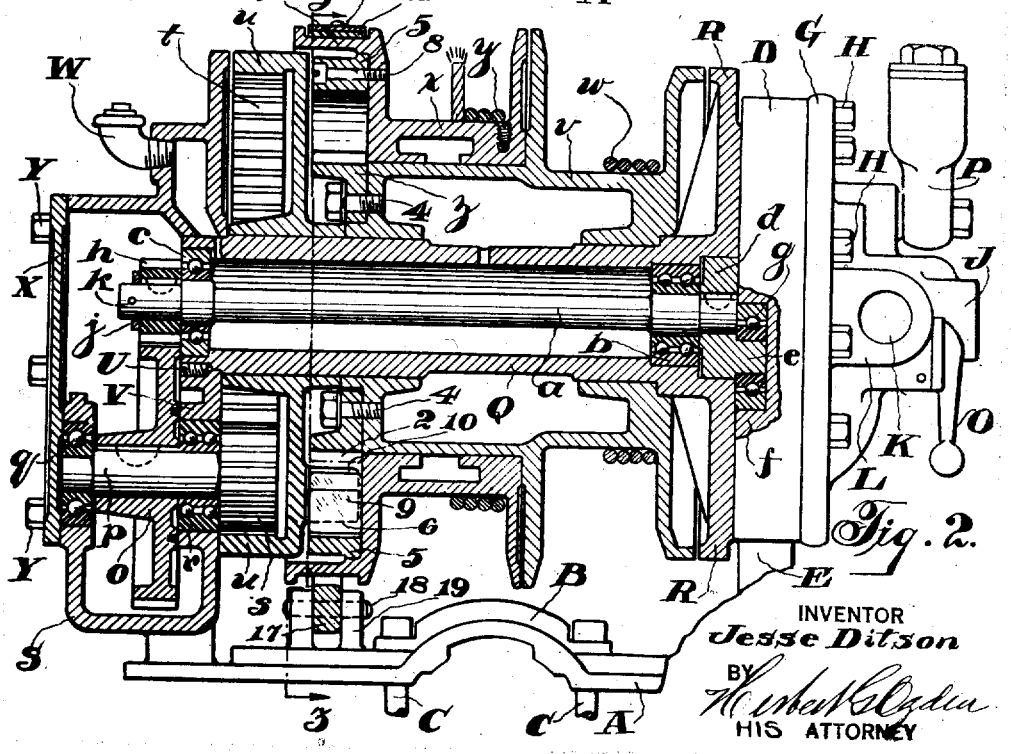
Figure 2 is a longitudinal sectional elevation on the line 2—2 of Figure 3.

The haulage drum $v$ to which one length of the rope $w$ is adapted to be connected, rotates upon the center bearing Q and the concentric tail rope drum $x$ to which the tail rope $y$ is connected preferably rotates upon the haulage drum $v$ as indicated particularly in Figure 2. Such construction of concentric drums materially reduces the over-all length of the hoist and produces a more compact and better balanced hoist than heretofore.

Means are provided for automatically connecting the main driver $u$ to one or the other of the drums $v$ and $x$ in accordance with the direction of rotation of the driving shaft $a$, and for this purpose the haulage drum $v$ is provided with a driver $z$ preferably in the form of a ring having clutch members in the form of teeth 2 merging into cam surfaces 3. The driver $z$ is suitably secured to the haulage drum by means of the bolts 4, and for convenience of description may be termed the inner driver.

The tail rope drum $x$ is likewise provided with a driver 5 opposed to the driver $z$ and preferably in the form of a ring having clutch members in the form of teeth 6 facing in the opposite direction from the teeth 2 on the driver $z$ and merging into the cam surfaces 7. The driver 5 is secured to the tail rope drum $x$ by means of the bolts 8, and for convenience of description may be termed the outer driver.

The spaced teeth 2 and 6 of each series on the opposed drivers preferably extend radially or in the plane of the respective driver on which they are formed.

The terms inner and outer as applied to the opposed drivers $z$ and 5 carried by the drums respectively, are not to be understood as necessarily limited to ratchet rings concentric with the axis of rotation of the machine, but are intended to be used as suitable designations for two opposed ratchet faces for the drums, having reference to some fixed point of the machine, which obviously need not be the driving shaft.

Figure 3:
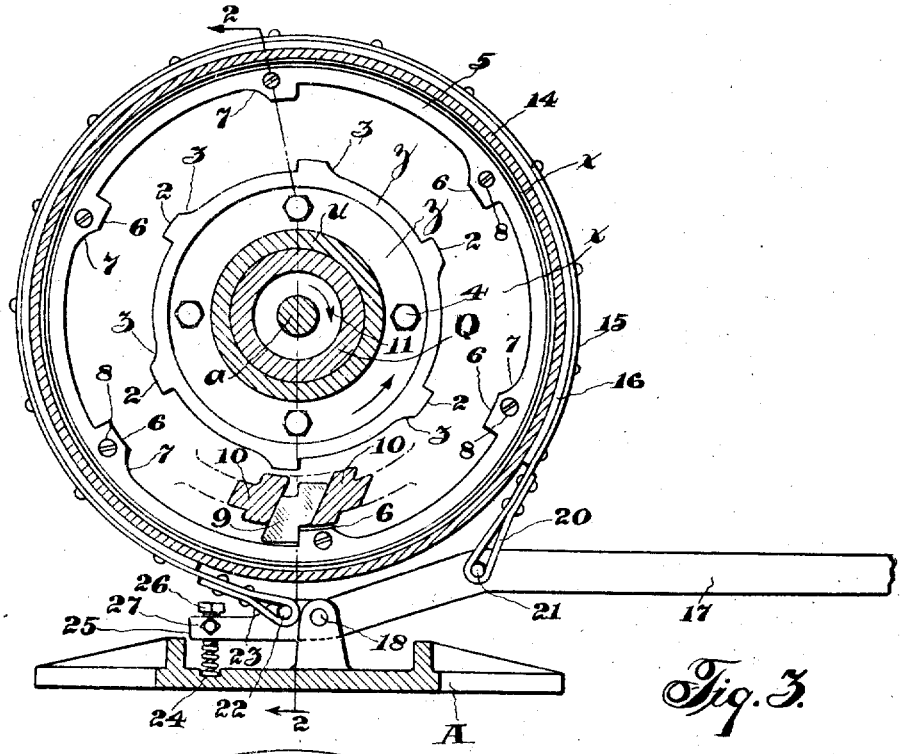
Figure 3 is a transverse sectional elevation on the line 3—3 of Figure 2, looking in the direction of the arrows.
Figure 4:
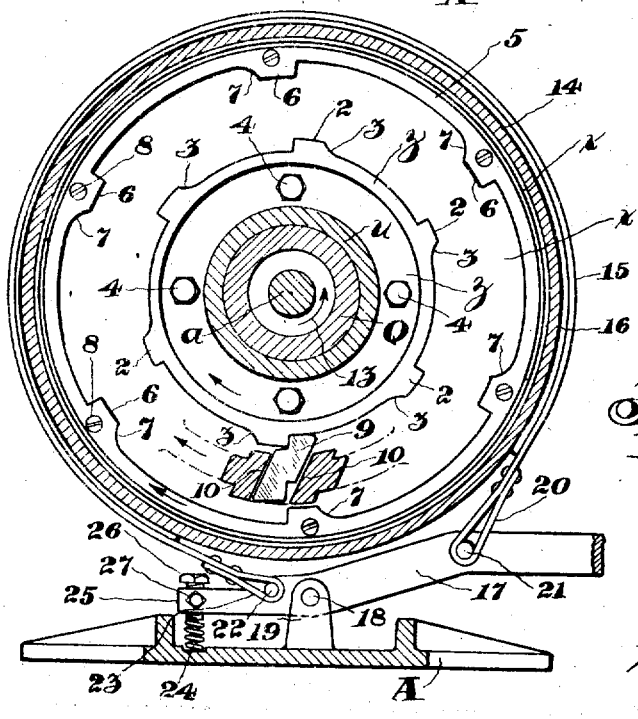
Figure 4 is a view similar to Figure 3 with the pawl in a different position.

The main driver $u$ is provided with a movable clutch member 9, preferably in the form of a pawl, guided solely upon the main driver and shown as slidable substantially radially between the lugs 10 projecting inwardly from the main driver $u$ into a position between the inner driver $z$ and outer driver 5, so that the pawl 9 may engage either one of the inner or outer drivers as indicated in Figures 3 and 4, in accordance with the direction of rotation of the driving shaft $a$.

The pawl 9 as shown, is separate from but carried wholly by the main driver $u$ and is mounted on the body portion of the main driver at a point remote, or at a substantial distance in a radial direction, from the driving shaft $a$. The main driver rotates in fixed longitudinal relationship to the drums, while the pawl 9 is automatically movable or adjustable relatively to the main driver and to the drums.

In the operation of the hoist, if it be assumed that the driving shaft $a$ is rotated in the direction of the arrow 11 in Figure 3, the main driver $u$ will be rotated by the train of gearing described, in the opposite direction, and the pawl 9 will have been pushed by one of the cam surfaces 3 on the inner driver $z$ into engagement with one of the teeth 6 of the outer driver 5, thus driving the tail rope drum $x$ in the same direction as the main driver but in the opposite direction to the rotation of the driving shaft $a$. The arrow 12 in Figure 1 on the tail rope drum $x$ indicates the direction of rotation of said drum under such circumstances when power is applied to the drum to wind up the tail rope. The haulage drum $v$ is disconnected from the driving shaft $a$ but is freely rotated in the same direction as the tail rope drum $x$ as the rope is unwinding from said haulage drum.

Upon reversing the direction of rotation of the driving shaft $a$ and causing it to rotate in the direction of the arrow 13 in Figure 4, the direction of rotation of the main driver $u$ will be reversed and the pawl 9 will be pushed by one of the cam surfaces 7 on the outer driver 5 into engagement with one of the teeth 2 on the inner driver $z$ thus driving the haulage drum $v$ in the direction of the arrow $13^a$ in Figure 1 oppositely to the direction of rotation of the driving shaft. In such case, the rope will be wound up on the haulage drum and the tail rope drum will be rotated freely in the same direction as the haulage drum as the rope is unwound from the tail rope drum. One drum or the other will be automatically connected to be driven from the driving shaft as often as the direction of rotation of the driving shaft is reversed. In a hoist of the character described, a brake is preferably provided for one of the drums, it being unnecessary to provide a brake for both drums in accordance with my construction. In this instance, the tail rope drum $x$ may be conveniently provided with a flange 14 to which a brake band 15 having a suitable lining 16 is applied. A brake lever 17 is fulcrumed at 18 on the lugs 19 and one looped end 20 of the brake band is connected to a pin 21 on the brake lever 17 located further away from the fulcrum 18 than the pin 22 to which the other looped end 23 of the brake band is connected. A compression spring 24 beneath the shorter arm 25 of the brake lever is adapted to be compressed between an adjusting screw 26 and the frame A. A set screw 27 holds the adjusting screw 26 in adjustment. Pressure upon the longer arm of the brake lever 17 tightens the brake on the tail rope drum $x$, and controls the rotation of both drums as long as the drums are connected through the agency of the cable and are doing work. It is obvious also that, owing to the positions of the pins 21 and 22 relative to the brake lever fulcrum 18, the brake will be automatically tightened by friction between the flange 14 of the tail rope drum $x$ and the brake lining 16 in case the drums should accidentally tend to rotate backwardly in the opposite direction from that in which power is applied. The brake therefore, acts as an automatic safety device.

I am not to be understood as limiting the invention to the particular devices and constructions shown in the drawings, and described in the specification, since those skilled in the art may devise equivalent construction within the spirit of my invention as defined in the appended claims.

I claim:

1. In a hoist, the combination of a frame, a driving shaft, two drums rotatable relatively to the driving shaft, a motor connected to operate the driving shaft, and means including a movable pawl mounted remote from the driving shaft between portions of the drums, for automatically disconnecting one drum and connecting the other drum to the driving shaft in accordance with the direction of rotation of the driving shaft.

2. In a hoist, the combination of a frame, a driving shaft, two drums rotatable relatively to the driving shaft, a motor connected to operate the driving shaft, opposed drivers carried by said drums respectively, a main driver connected to be rotated by the driving shaft, and means including a movable member carried wholly by the main driver for automatically connecting said main driver to one or the other of the said opposed drivers in accordance with the direction of rotation of the driving shaft.

3. In a hoist, the combination of a frame, a driving shaft, two drums concentric with the driving shaft, a motor connected to operate the driving shaft, opposed drivers carried by said drums respectively, a main driver rotated by the driving shaft, and a movable member carried by and guided solely upon the main driver for automatically connecting said main driver to one or the other of the said opposed drivers in accordance with the direction of rotation of the driving shaft.

4. In a hoist, the combination of a frame, a driving shaft, two drums concentric with the driving shaft, a motor connected to operate the driving shaft, opposed drivers carried by said drums respectively, a main driver rotated by the driving shaft, and a pawl carried wholly by the main driver for automatically connecting said main driver to one or the other of the said opposed drivers in accordance with the direction of rotation of the driving shaft.

5. In a hoist, the combination of a frame, a driving shaft, two drums concentric with the driving shaft, one drum being rotatable upon the other drum, a motor connected to operate the driving shaft, inner and outer concentric drivers carried by the said drums respectively, a main driver rotated by the driving shaft, a movable member carried by the main driver and located between the inner and outer drivers, and means for automatically actuating said movable member to connect the main driver to one or the other of the inner and outer drivers in accordance with the direction of rotation of the driving shaft.

6. In a hoist, the combination of a frame, a driving shaft, two drums concentric with the driving shaft, one drum being rotatable upon the other drum, a motor connected to operate the driving shaft, inner and outer concentric drivers carried by the said drums respectively, a main driver rotated by the driving shaft, a pawl carried by the main driver and located between the inner and outer drivers, and means for automatically actuating said pawl to connect the main driver to one or the other of the inner and outer drivers in accordance with the direction of rotation of the driving shaft.

7. In a hoist, the combination of a frame, a driving shaft, two drums rotatable relatively to the driving shaft, a motor connected to operate the driving shaft, means including a movable pawl mounted remote from the driving shaft between portions of the drums, for automatically disconnecting one drum and connecting the other drum to the driving shaft in accordance with the direction of rotation of the driving shaft, and a brake for one of said drums.

8. In a hoist, the combination of a frame, a driving shaft, two drums concentric with the driving shaft, a motor connected to operate the driving shaft, opposed drivers carried by said drums respectively, a main driver rotated by the driving shaft and means including a movable member carried by and guided solely upon the main driver for automatically connecting said main driver to one or the other of the said opposed drivers in accordance with the direction of rotation of the driving shaft, and a brake for one of said drums.

9. In a hoist, the combination of a frame, a driving shaft, two drums concentric with the driving shaft, a motor connected to operate the driving shaft, opposed drivers carried by said drums respectively, a main driver rotated by the driving shaft, means for automatically connecting said main driver to one or the other of the said opposed drivers in accordance with the direction of rotation of the driving shaft, and a brake for one of the drums adapted to automatically tighten and retard rotation in a direction counter to power applied by the driving shaft to said drum.

10. In a hoist, the combination of a frame, a driving shaft, a motor connected to operate the driving shaft, a haulage drum, and a tail rope drum concentric with the driving shaft, the tail rope drum being mounted to rotate upon the haulage drum, a driver carried by the haulage drum, an opposed driver carried by the tail rope drum, a main driver rotated by the driving shaft, a movable member carried by said main driver between the said opposed drum drivers, and means automatically actuating said movable member to connect the main driver to one or the other of the said opposed drivers in accordance with the direction of rotation of the driving shaft.

11. In a hoist, the combination of a frame, a driving shaft, a motor connected to operate the driving shaft, a haulage drum, and a tail rope drum concentric with the driving shaft, the tail rope drum being mounted to rotate upon the haulage drum, a driver carried by the haulage drum, an opposed driver carried by the tail rope drum, a main driver rotated by the driving shaft, a movable member carried by said main driver between the said opposed drum drivers, means automatically actuating said movable member to connect the main driver to one or the other of the said opposed drivers in accordance with the direction of rotation of the driving shaft, and a brake for one of said drums.

12. In a hoist, the combination of a frame, a driving shaft, a motor connected to operate the driving shaft, two concentric drums, an inner driver on one drum in the form of a ring having external teeth, an outer driver on the other drum in the form of a concentric ring having internal teeth, a main driver rotated by the driving shaft, and a radially movable pawl carried by said main driver and adapted to engage the teeth of the inner or outer driver in accordance with the direction of rotation of the driving shaft.

13. In a hoist, the combination of a frame, a driving shaft, a motor connected to operate the driving shaft, two concentric drums, an inner driver on one drum in the form of a ring having external teeth merging into cam surfaces, and an outer driver on the other drum in the form of a concentric ring having internal teeth facing oppositely to the teeth on the inner driver and merging into cam surfaces, a main driver rotated by the driving shaft, and a radially movable pawl carried by said main driver and actuated by said cam surfaces on the inner and outer drivers into engagement with the teeth on one or the other of said drivers in accordance with the direction of rotation of the driving shaft.

14. In a hoist, the combination of a frame, a driving shaft, a motor connected to operate the driving shaft, a haulage drum and a tail rope drum concentric with the driving shaft, the tail rope drum being mounted to rotate upon the haulage drum, an inner driver in the form of a ring on the haulage drum having external teeth, an outer driver on the tail rope drum in the form of a concentric ring having internal teeth, a main driver rotated by the driving shaft, and a radially movable pawl carried by said main driver and adapted to engage the teeth of the inner or outer driver in accordance with the direction of rotation of the driving shaft.

15. In a hoist, the combination of a frame, a driving shaft, a motor connected to operate the driving shaft, a haulage drum and a tail rope drum concentric with the driving shaft, the tail rope drum being mounted to rotate upon the haulage drum, an inner driver in the form of a ring on the haulage drum having external teeth merging into cam surfaces, an outer driver on the tail rope drum in the form of a concentric ring having internal teeth facing oppositely to the teeth on the inner driver and merging into cam surfaces, a main driver rotated by the driving shaft, and a radially movable pawl carried by said main driver and actuated by said cam surfaces on the inner and outer drivers into engagement with the teeth on one or the other of said drivers in accordance with the direction of rotation of the driving shaft.

16. In a hoist, the combination of a frame, a driving shaft, two drums rotatable relatively to the driving shaft, a motor connected to operate the driving shaft, opposed drivers carried by said drums respectively, a main driver connected to be rotated by the driving shaft in fixed longitudinal relationship to the drums, and a pawl carried wholly by the main driver remote from the driving shaft for automatically connecting said main driver to one or the other of the said opposed drivers in accordance with the direction of rotation of the driving shaft.

17. In a hoist, the combination of a frame, a driving shaft, two drums adapted to be driven alternately from the driving shaft, a motor connected to operate the driving shaft, and main driving means for the drums, having a body portion connected to be rotated by the driving shaft in fixed longitudinal relationship to the drums and including a separate drum connecting means carried wholly by the said body portion at a substantial distance in a radial direction from the driving shaft but automatically adjustable relatively to both the body portion of the main driving means and to the drums, for automatically connecting the said driving means to one or the other of the drums in accordance with the direction of rotation of the driving shaft.

18. In a hoist, the combination of a frame, a driving shaft, two drums adapted to be driven alternately from the driving shaft, a motor connected to operate the driving shaft, opposed drivers for the drums respectively, a main driver for the drums, means connecting said main driver to be rotated by the driving shaft in fixed longitudinal relationship to the drums, and a separate drum connecting member carried wholly by the main driver at a substantial distance in a radial direction from the driving shaft but movable relatively to both the main driver and to the opposed drum drivers, for automatically connecting the main driver to one or the other of the opposed drivers in accordance with the direction of rotation of the driving shaft.

19. In a hoist, the combination of a frame, a driving shaft, two drums adapted to be driven alternately from the driving shaft, a motor connected to operate the driving shaft, opposed drivers for the drums respectively, a main driver for the drums, means connecting said main driver to be rotated by the driving shaft in fixed longitudinal relationship to the drums, and a pawl separate from but carried wholly by the main driver at a substantial distance in a radial direction from the driving shaft and movable relatively to both the main driver and to the opposed drum drivers, for automatically connecting the main driver to one or the other of the opposed drivers in accordance with the direction of rotation of the driving shaft.

20. In a hoist, the combination of a frame, a driving shaft, two drums adapted to be driven alternately from the driving shaft, a motor connected to operate the driving shaft, opposed drivers for the drums respectively, each having series of spaced teeth formed with oppositely inclined faces, a main driver for the drums interposed between the drum drivers and connected to be rotated by the driving shaft, and a pawl carried wholly by the main driver and having a clutch tooth at each end, said clutch teeth being adapted to alternately engage one tooth of the series of teeth of the opposed drum drivers and being adapted to be actuated by the inclined faces of the said series of teeth on the drum drivers, to effect the shifting of the pawl from engagement with one tooth of one drum driver to one tooth of the other drum driver.

21. In a hoist, the combination of a reversible motor, a hollow center bearing extending therefrom, a main shaft within the center bearing, a main driver on the exterior of the center bearing geared to the main shaft, drums rotatably mounted relatively to the hollow center bearing, and a clutch member on the main driver adapted to connect either drum to the said main driver.

22. In a hoist, the combination of a reversible motor, a hollow center bearing extending therefrom, a main shaft within the center bearing, a main driver on the exterior of the center bearing geared to the main shaft, a drum loosely journaled on the center bearing, another drum rotatable relatively to the center bearing about the same axis as the first drum, toothed rings on adjacent ends of the drums, and a shiftable pawl carried by the main driver and located between the said toothed rings, said pawl and rings having means for automatically shifting the pawl from the teeth of one ring to the teeth of the other, and vice versa accordingly as the direction of rotation of the main driver is reversed.

23. In a hoist, the combination of a frame, a driving shaft, two drums rotatable relatively to the driving shaft, a motor connected to operate the driving shaft, opposed drivers for the drums in the form of rings, each having series of oppositely facing teeth, the teeth of each series extending in the plane of the respective driver on which they are formed, a main driver connected to be rotated by the driving shaft, and a movable member carried wholly by the main driver and adapted to cooperate alternately with the teeth of the opposed drivers for automatically connecting said main driver to one or the other of the said opposed drivers in accordance with the direction of rotation of the driving shaft.

24. In a hoist, the combination of a frame, a driving shaft, two drums rotatable relatively to the driving shaft, a motor connected to operate the driving shaft, opposed drivers for the drums each having series of oppositely facing radially extending teeth, a main driver connected to be rotated by the driving shaft, and a movable member carried wholly by the main driver and adapted to cooperate alternately with the teeth of the opposed drivers for automatically connecting said main driver to one or the other of the said opposed drivers in accordance with the direction of rotation of the driving shaft.

In testimony whereof I have signed this specification.

JESSE DITSON.